(12) United States Patent
Okazaki et al.

(10) Patent No.: US 10,318,841 B2
(45) Date of Patent: Jun. 11, 2019

(54) MEDICAL-IMAGE PROCESSING APPARATUS, ULTRASONIC DIAGNOSTIC APPARATUS, AND MEDICAL-IMAGE PROCESSING METHOD

(71) Applicant: Toshiba Medical Systems Corporation, Otawara-shi (JP)

(72) Inventors: Tomoya Okazaki, Kawasaki (JP); Yukinobu Sakata, Kawasaki (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 171 days.

(21) Appl. No.: 15/435,947

(22) Filed: Feb. 17, 2017

(65) Prior Publication Data

US 2017/0249532 A1     Aug. 31, 2017

(30) Foreign Application Priority Data

Feb. 26, 2016    (JP) .................................. 2016-036324

(51) Int. Cl.
    *G06K 9/00*      (2006.01)
    *G06K 9/48*      (2006.01)
    *G06K 9/62*      (2006.01)

(52) U.S. Cl.
CPC ........... *G06K 9/481* (2013.01); *G06K 9/6207* (2013.01); *G06K 9/6282* (2013.01); *G06K 2009/485* (2013.01); *G06K 2209/051* (2013.01)

(58) Field of Classification Search
None
See application file for complete search history.

(56) References Cited

U.S. PATENT DOCUMENTS

| | | | |
|---|---|---|---|
| 7,079,674 B2 | 7/2006 | Paragios et al. | |
| 2010/0177946 A1 | 7/2010 | De Bruijne et al. | |
| 2014/0219524 A1 | 8/2014 | Takeguchi et al. | |
| 2015/0018698 A1 | 1/2015 | Safran et al. | |

FOREIGN PATENT DOCUMENTS

| | | |
|---|---|---|
| JP | 2004-529713 | 9/2004 |
| JP | 2010-527647 | 8/2010 |
| JP | 2015-16328 | 1/2015 |
| WO | WO 02/093188 A2 | 11/2002 |
| WO | WO 2008/141996 A2 | 11/2008 |
| WO | WO 2012/153539 A1 | 11/2012 |

OTHER PUBLICATIONS

T. F. Cootes et al. "Active Shape Models—Their Training and Application." Computer Vision and Image Understanding, vol. 61, No. 1, Jan. 1995, pp. 22.
Michael Kass et al. "Snakes: Active Contour Models." International Journal of Computer Vision, 1988, pp. 11.

*Primary Examiner* — Atiba O Fitzpatrick
(74) *Attorney, Agent, or Firm* — Oblon, McClelland, Maier & Neustadt, L.L.P.

(57) ABSTRACT

A medical-image processing apparatus according to an embodiment includes processing circuitry. The processing circuit acquires an initial value of an outline corresponding vector that corresponds to an outline of a subject included in medical image data. The processing circuitry updates the outline corresponding vector based on a derivative that is acquired by differentiating a cost function with respect to the outline corresponding vector by the outline corresponding vector, and on the initial value of the outline corresponding vector.

11 Claims, 6 Drawing Sheets

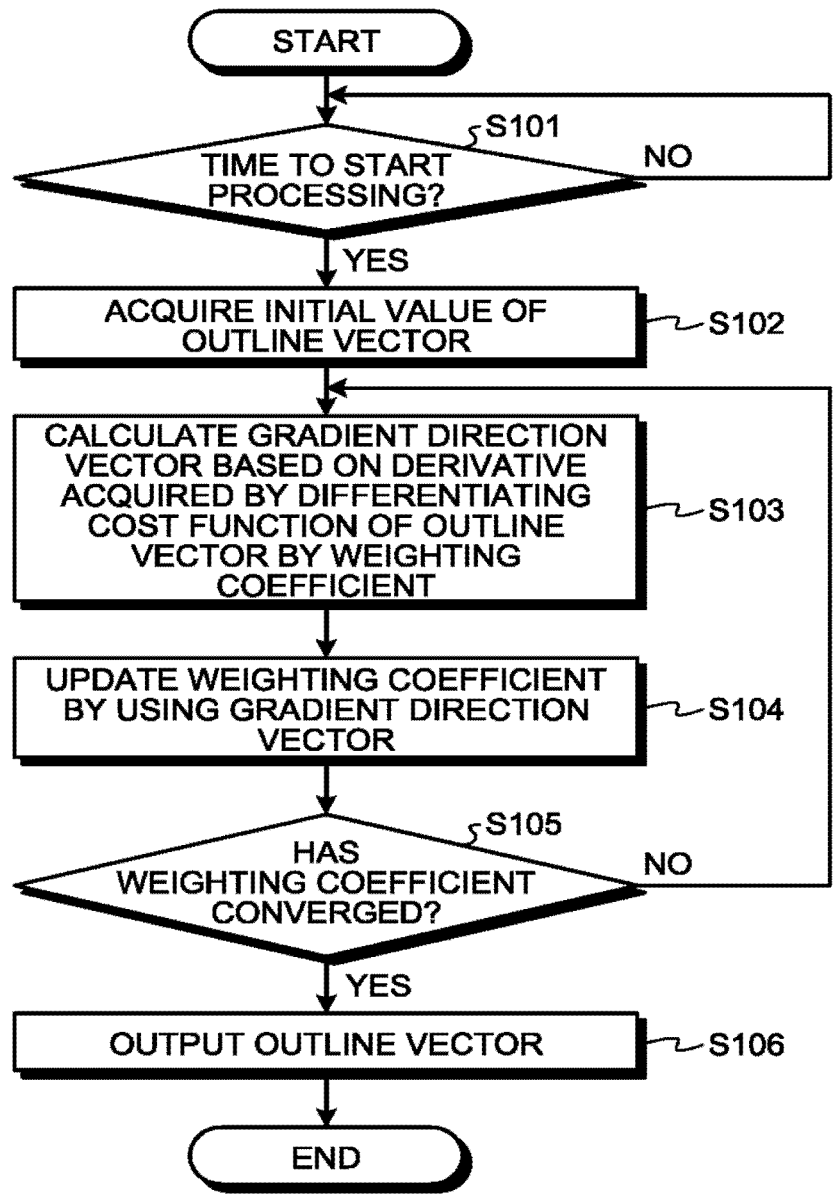

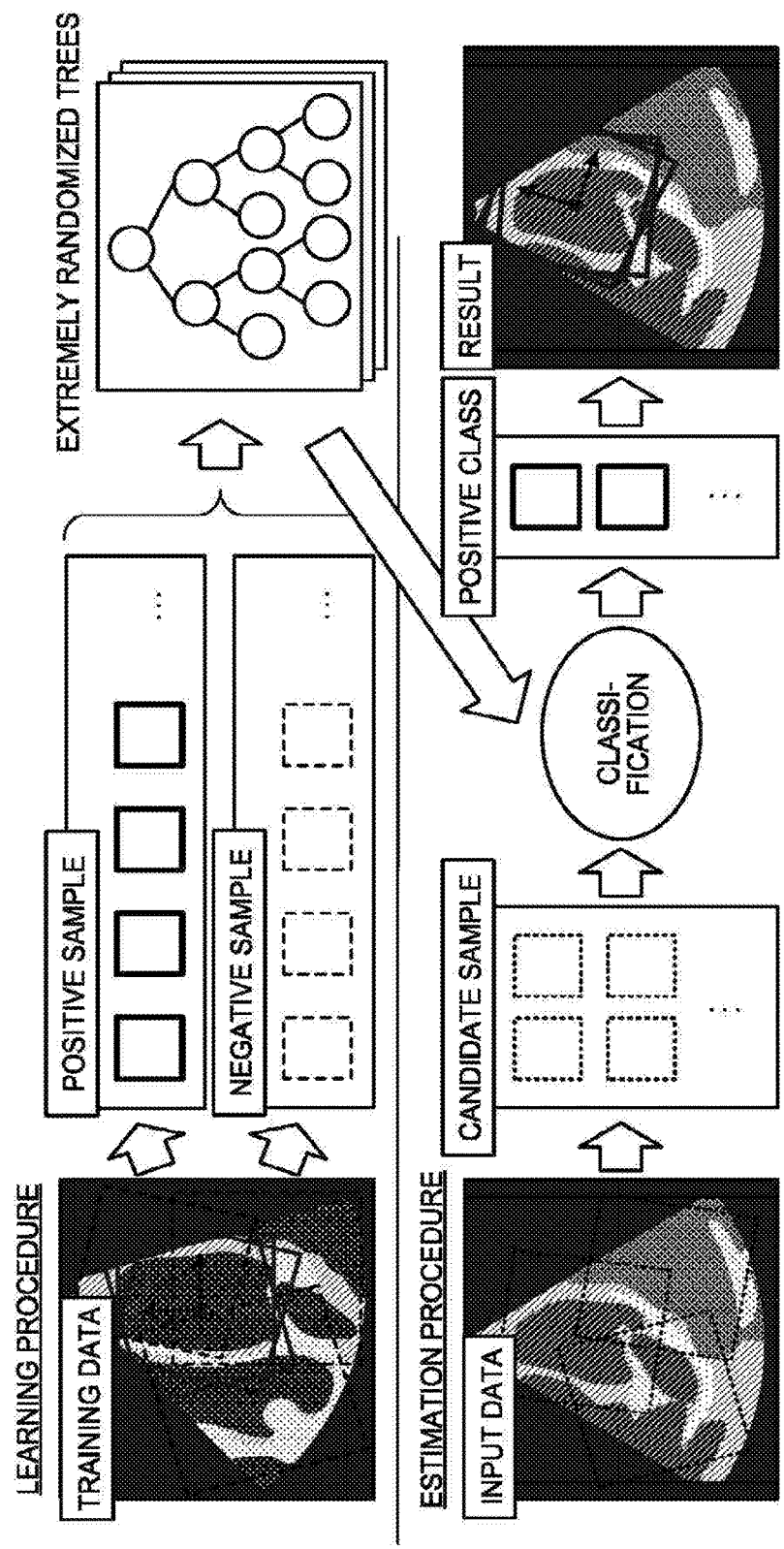

MEDICAL-IMAGE PROCESSING APPARATUS, ULTRASONIC DIAGNOSTIC APPARATUS, AND MEDICAL-IMAGE PROCESSING METHOD

CROSS-REFERENCE TO RELATED APPLICATIONS

This application is based upon and claims the benefit of priority from Japanese Patent Application No. 2016-36324, filed on Feb. 26, 2016; the entire contents of which are incorporated herein by reference.

FIELD

Embodiments described herein relate generally to a medical-image processing apparatus, an ultrasonic diagnostic apparatus, and a medical-image processing method.

BACKGROUND

Conventionally, various techniques have been proposed to detect an outline of a subject that is drawn in medical image data. As one example, a line expressing an outline is approximated with a row of plural points, and the row of points is set as an outline vector. Furthermore, a direction vector that indicates a direction toward which a cost function with respect to the outline vector decreases is calculated by using numerical differentiation. A method of detecting an outline by repeatedly transforming the outline until the shape of the outline converges by using this direction vector has been known.

BRIEF DESCRIPTION OF THE DRAWINGS

FIG. 5 is a flowchart showing a processing procedure of the medical-image processing apparatus according to the present embodiment;
and
FIG. 6 is a diagram for explaining processing of an acquiring function according to another embodiment.

DETAILED DESCRIPTION

Figure 1:
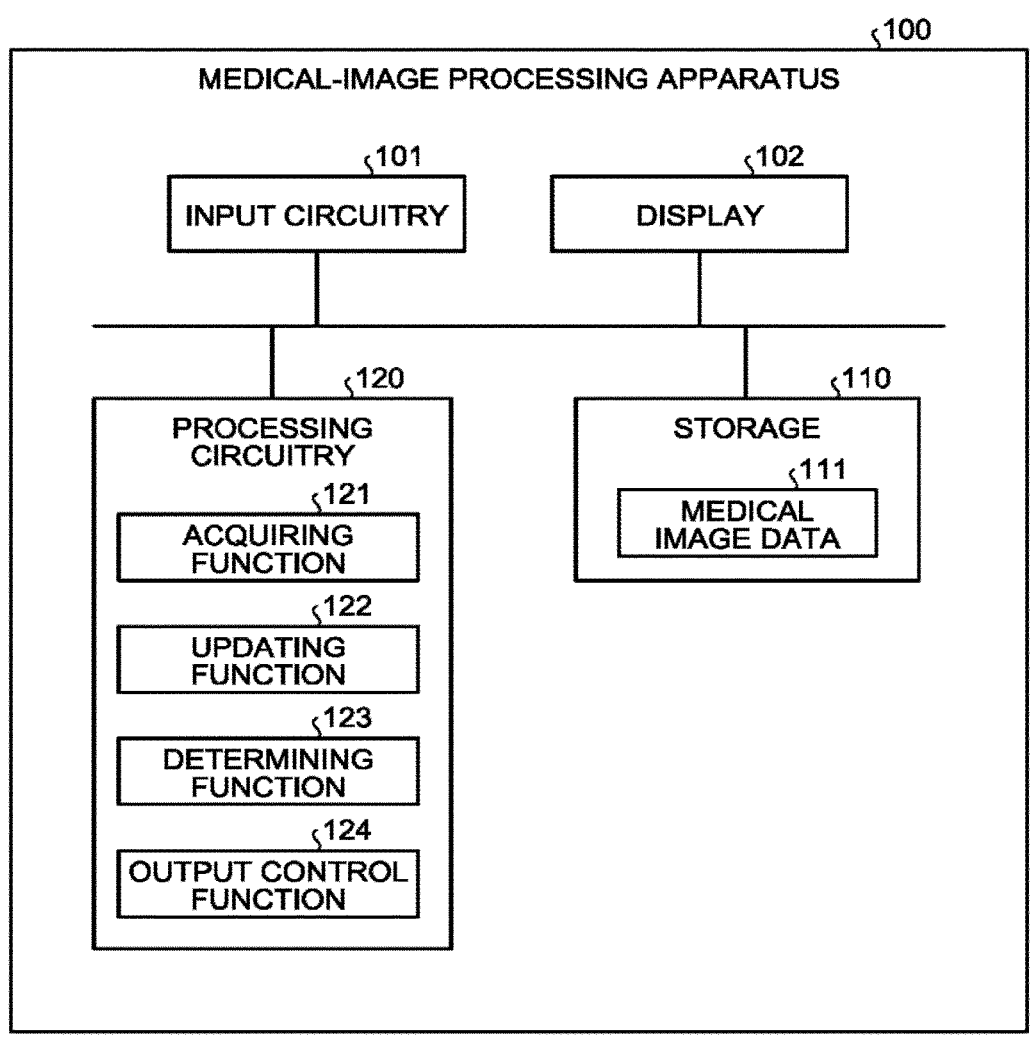
FIG. 1 is a block diagram showing an example of a medical-image processing apparatus according to the present embodiment.

A medical-image processing apparatus of an embodiment includes processing circuitry. The processing circuitry acquires an initial value of an outline corresponding vector that corresponds to an outline of a subject that is included in medical image data. The processing circuitry updates the outline corresponding vector based on a derivative that is acquired by differentiating a cost function with respect to the outline corresponding vector by the outline corresponding vector, and on the initial value of the outline corresponding vector.

The medical-image processing apparatus, an ultrasonic diagnostic apparatus, and a medical-image processing method according to the embodiment are explained below with reference to the drawings. In the following embodiment, detection of an outline of a left ventricle (an inner boundary of a myocardium and an outer boundary of the myocardium) from two-dimensional ultrasonic image data of a heart of a subject imaged by an ultrasonic diagnostic apparatus is explained as one example.

The following embodiment is merely an example, and it is applicable to other embodiments. For example, although application to ultrasonic image data acquired by an ultrasonic diagnostic apparatus is explained in the following example, it is also applicable to medical image data that is acquired by another medical diagnostic imaging apparatus. As another medical diagnostic imaging apparatus, for example, an X-ray diagnostic apparatus, an X-ray computed tomography (CT) apparatus, a magnetic resonance imaging (MRI) apparatus, a single photon emission computed tomography (SPECT) apparatus, a positron emission computed tomography (PET) apparatus, a SPECT-CT apparatus in which the SPECT apparatus and the CT apparatus are integrated, a PET-CT apparatus in which the PET apparatus and the x-ray CT apparatus are integrated, or a group of these apparatuses can be applied.

Moreover, for example, although application to two-dimensional medical image data is explained in the following example, it is not limited thereto, but is also applicable to three-dimensional medical image data (volume data). That by expanding a definition of all equations of an outline vector, a gradient vector, and the like explained below to three dimension, processing equivalent to processing for two-dimensional medical image data becomes possible to be performed also on three-dimensional medical image data. Furthermore, the processing for two-dimensional medical image data is applicable to a cross-section image data of an arbitrary position obtained from the volume data. Furthermore, medical image data can be a still image, or a moving image. When applying to a moving image, it can be applied to entire medical image data included in the moving image, or can be applied to arbitrary medical image data.

Moreover, for example, although detection of an outline of a left ventricle of a heart is explained below, it is not limited thereto. It can be detection of an outline of a right ventricle, a left atrium, or a right atrium, or can be detection of an outline of an organ other than heart.

Embodiment

FIG. 1 is a block diagram showing a configuration example of a medical-image processing apparatus 100 according to the present embodiment. As shown in FIG. 1, for example the medical-image processing apparatus 100 includes input circuitry 101, a display 102, a storage 110, and processing circuitry 120. The input circuitry 101, the display 102, the storage 110, and the processing circuitry 120 are connected so as to enable mutual communication.

The input circuitry 101 corresponds to a mouse, a keyboard, a button, a panel switch, a touch command screen, a footswitch, a trackball, a joy stick, and the like. For example, the input circuitry 101 accepts various kinds of instructions and setting requests from an operator of the medical-image processing apparatus 100. The input circuitry 101 outputs the various kinds of accepted instructions and setting requests to the processing circuitry 120.

The display 102 displays medical image data that is stored in storage 110, or a graphical user interface (GUI) for an operator to input various kinds of setting requests by using the input circuitry 101.

The storage 110 stores various kinds of programs to display medical image data and a GUI, and data used by the programs. For example, the storage 110 stores medical image data 111. Note that the storage 110 is one example of a storage unit.

The medical image data 111 is, for example, two-dimensional ultrasonic image data of a heart of a subject imaged by an ultrasonic diagnostic apparatus. In this ultrasonic image data, a predetermined section of the heart of the subject is drawn. That is, the medical image data 111 is a processing subject processing to detect an outline, and is image data that is output from the ultrasonic diagnostic apparatus. For example, the medical image data 111 is associated with a patient identification (ID), an examination ID, an apparatus ID, a series ID, and the like per examination, to be stored.

The processing circuitry 120 controls the entire medical-image processing apparatus 100. For example, as shown in FIG. 1, the processing circuitry 120 performs an acquiring function 121, an updating function 122, determining function 123, and an output control function 124. Respective processing functions performed by the acquiring function 121, the updating function 122, the determining function 123, and the output control function 124, which are the components of the processing circuitry 120 shown in FIG. 1, are stored in a form of a computer-executable program in the storage 110. The processing circuitry 120 is a processor that reads and executes the respective programs from the storage 110, thereby implementing the functions corresponding to the respective programs. In other words, the processing circuitry 120 that has read the respective programs is to have the respective functions shown in the processing circuitry 120 in FIG. 1.

Although it is explained as the respective processing functions explained below are implemented by a single unit of the processing circuitry 120 in the present embodiment, a processing circuitry can be configured by combining multiple independent processors, to implement the function by each processor executing the program.

The word "processor" used in the above explanation signifies, for example, a central processing unit (CPU), a graphics processing unit (GPU), or a circuit such as an application specific integrated circuit (ASIC) and a programmable logic device (for example, a simple programmable logic device (SPLD), a complex programable logic device (CPLD), and a field programmable gate array (FPGA)). The processor implements functions by reading and executing programs that are stored in the storage. Instead of storing the programs in the storage 110, it can be configured to install the programs directly in a circuit of the processor. In this case, the processor implements functions by reading and executing programs that are installed in the circuit, of the processor. The respective processors of the present embodiment are not limited to be configured as a single unit of circuit per processor, but can be configured as one processor by combining plural independent processors to implement the function. Furthermore, more than one component in drawings can be integrated into one processor to implement the functions.

The acquiring function 121 acquires an initial value of the outline corresponding vector that corresponds to the outline of the subject that is included in the medical image data 111. The outline corresponding vector is, for example, an outline vector that expresses the outline of the subject, or a vector that is expressed by a coefficient acquired by principal component analysis of the outline vector. In the following explanation, an example in which the outline vector is used as the outline corresponding vector is explained. For example, the acquiring function 121 sets an initial value of the outline vector of the left ventricle to the two-dimensional ultrasonic image data of the heart of the subject. The outline vector is what is obtained by approximating a line expressing an outline of a subject (edge line) with a row of multiple points, and by expressing the row of multiple points by one vector. The acquiring function 121 is one example of an acquiring unit.

Figure 2:
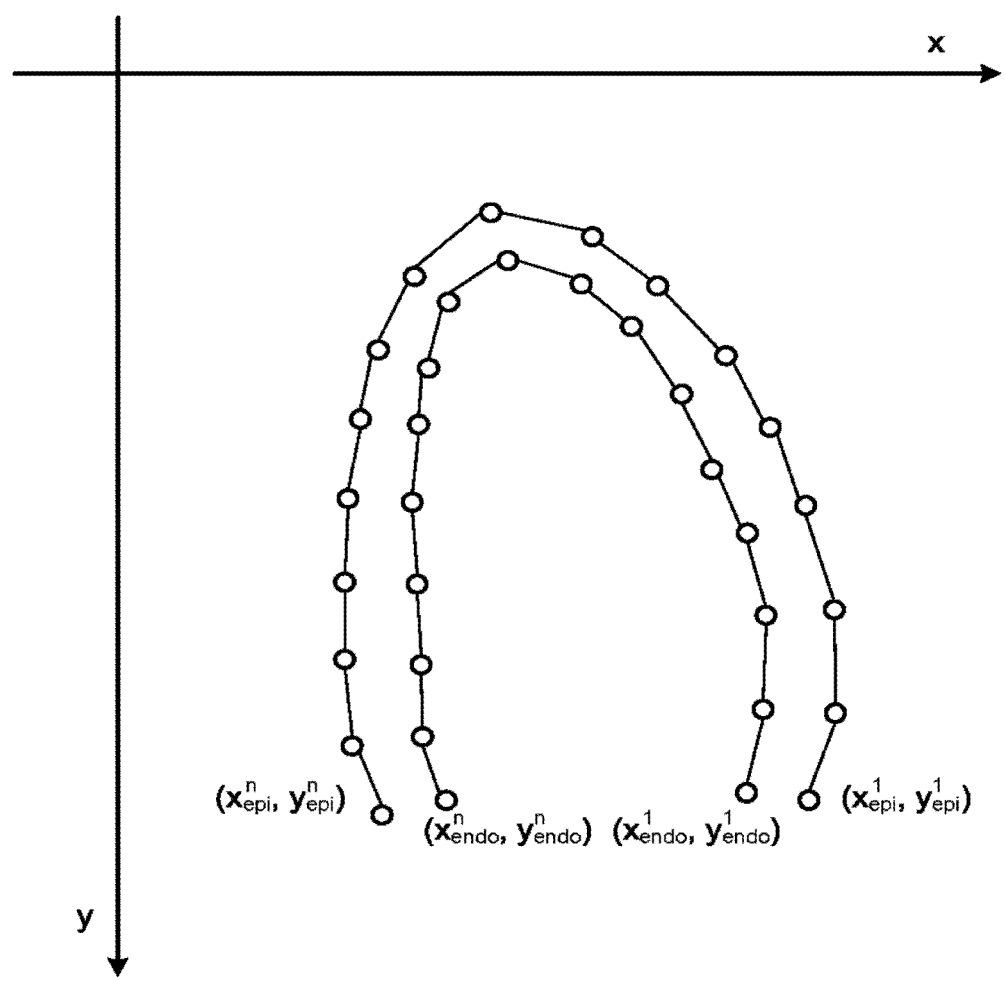
FIG. 2 is a diagram for explaining an outline vector according to the present embodiment.

FIG. 2 is a diagram for explaining the outline vector according to the present embodiment. FIG. 2 shows an outline vector of a left ventricle. In FIG. 2, a horizontal axis corresponds to an x axis of the medical image data 111, and a vertical axis corresponds to a y axis of the medical image data 111.

As shown in FIG. 2, the outline vector of the left ventricle corresponds to what is obtained by approximating an edge line of the left ventricle with a row of multiple points, and by expressing the row of multiple points with one vector. The outline of the left ventricle includes an inner boundary of a myocardium and an outer boundary of the myocardium. Out of these, an edge line of the inner boundary of the myocardium is approximated with a row of n pieces of points from $(x\_endo\char`\^1, y\_endo\char`\^1)$ to $(x\_endo\char`\^n, y\_endo\char`\^n)$. Moreover, an edge line of the outer boundary of the myocardium is approximated with a row of n pieces of points from $(x\_epi\char`\^1, y\_epi\char`\^1)$ to $(x\_epi\char`\^n, y\_epi\char`\^n)$. Therefore, the outline vector "x" of the left ventricle is expressed by Equation (1) below. The outline vector "x" is a vector of 1×4n as shown in Equation (1).

$$x = [x_{endo}^1, y_{endo}^1, \ldots, x_{endo}^n, y_{endo}^n, x_{epi}^1, y_{epi}^1, \ldots, x_{epi}^n, y_{epi}^n]^T \quad (1)$$

As one example, the acquiring function 121 acquires the initial value of the outline vector of the left ventricle by using an edge line of the left ventricle that is specified manually by an operator. Specifically, the acquiring function 121 accepts an operation to specify edge lines of the inner boundary of the myocardium and the outer boundary of the myocardium of the left ventricle on a screen of the display 102 on which the ultrasonic image data is displayed. The acquiring function 121 then sets an initial value of the outline vector by setting a row of the predetermined number (n pieces) of points at regular intervals on the edge lines specified by the operator.

Thus, the acquiring function 121 acquires the initial value of the outline vector of the subject included in the medical image data 111. Note that the explanation of the acquiring function 121 above is just one example. For example, the acquiring function 121 can set (create) an initial value of the outline vector automatically in the medical image data 111 without accepting specification by an operator. A method of creating an initial value of the outline vector automatically is described later.

Furthermore, although a case in which n pieces of points are set in each of the row of points to approximate the inner boundary of the myocardium and the row of points to approximate the outer boundary of the myocardium is exemplified, the embodiment is not limited thereto. That is, the number of points in a row of points to approximate the inner boundary of the myocardium and the outer boundary of the myocardium can differ from each other.

The updating function 122 updates the outline vector based on a derivative that is acquired by differentiating a cost function with respect to the outline vector by a coefficient acquired by principal component analysis of the outline vector. For example, the updating function 122 calculates a gradient direction vector that indicates a direction toward which the cost function decreases by substituting the outline vector into the derivative, and updates the outline vector by using the calculated gradient direction vector. The updating function 122 is one example of an updating unit.

For example, the updating function 122 sets a cost function with respect to the outline vector. The cost function herein is, for example, a function with which a smaller value (cost) is calculated as the medical image data 111, which is the subject of processing, and sample image data (that is, image data for learning) in which the position of an outline of a left ventricle is known are more similar to each other. In other words, by minimizing this cost function, the outline vector of a value close to that of the outline vector obtained from the sample image data is detected from input image data.

Although application of Active Shape Model described in Non-Patent Literature 1 as a method of detecting an outline is explained in the embodiment below, it is not limited thereto. For example, as a method of detecting an outline, Snakes described in Non-Patent Literature 2 can be applied.

As one example, the updating function 122 sets the cost function by using principal component analysis of the sample image data. Specifically, the updating function 122 acquires an average outline "x (with overline)" (hereinafter, the average outline is expressed also as "x bar") corresponding to an average of the outline vectors acquired from respective sample image data, a matrix "Φ" in which form basis vectors "φ_i" are aligned, and an eigenvalue "λ_i" corresponding to "φ_i" by performing principal component analysis on plural pieces of the sample image data. Thus, the outline vector "x" is expressed by Equation below. In Equation (2), "b" indicates a weighting coefficient.

$$x = \bar{x} + \Phi b \quad (2)$$

$$= \bar{x} + \sum_{i=1}^{L} b_i \varphi_i$$

The form basis vector "φ_i" is a 1×4n vector. "L" in Equation (2) is a parameter that indicates the basis to be used in processing among all of the basis 4n acquired by performing the principal component analysis on plural pieces of the sample image data. Note that "L" uses a basis vector up to that, the cumulative contribution calculated by "λ_i" of which exceeds a predetermined threshold.

The updating function 122 then formulates the cost function, using the parameter that is acquired by the above principal component analysis. Since the outline vector "x" can be expressed by the weighting coefficient "b" as shown in Equation (2), a cost function "E" is set as a cost function "E(b)" with respect to the weighting coefficient "b".

Although a case of using the cost function "E(b)" is explained in the present embodiment, embodiments are not limited thereto. For example, the cost function "E" can be set as a function "E(x)" with respect to the outline vector "x". However, because the weighting coefficient "b" is a 1×L vector while the outline vector "x" is a 1×4n vector, and because L<4n, higher speed processing can be expected by processing using the cost function "E(b)" of the weighting coefficient "b".

For example, the cost function "E(b)" can be expressed by Equation (3) below by using a cost with respect to an image "E_image(b)" and a cost with respect to a shape of an outline "E_shape(b)".

$$E(b) = \alpha E_{image}(b) + E_{shape}(b) \quad (3)$$

In Equation (3), "α" is a parameter for adjusting a relative importance between the cost with respect to the image "E_image(b)" and the cost with respect to the shape of the outline "E_shape(b)". For example, "α" is set in advance. In the following, the cost with respect to the image "E_image(b)" and the cost with respect to the shape of the outline "E_shape(b)" are explained sequentially.

First, the cost with respect to the image "E_image(b)" is explained. The cost with respect to the image "E_image(b)" is expressed, for example, by Equation (4) below.

$$E_{image}(b) = \sum_{v=1}^{n} \sum_{u=1}^{m} \{P(u, v) - P_{dic}(u, v)\}^2 \quad (4)$$

In Equation (4), "P (u, v)" is image data that is called a boundary pattern. For example, "P (u, v)" is created by resampling a brightness value on a point on a line segment that pass through one point on the inner boundary of the myocardium and the corresponding point on the outer boundary of the myocardium, from the medical image data 111.

Figure 3:
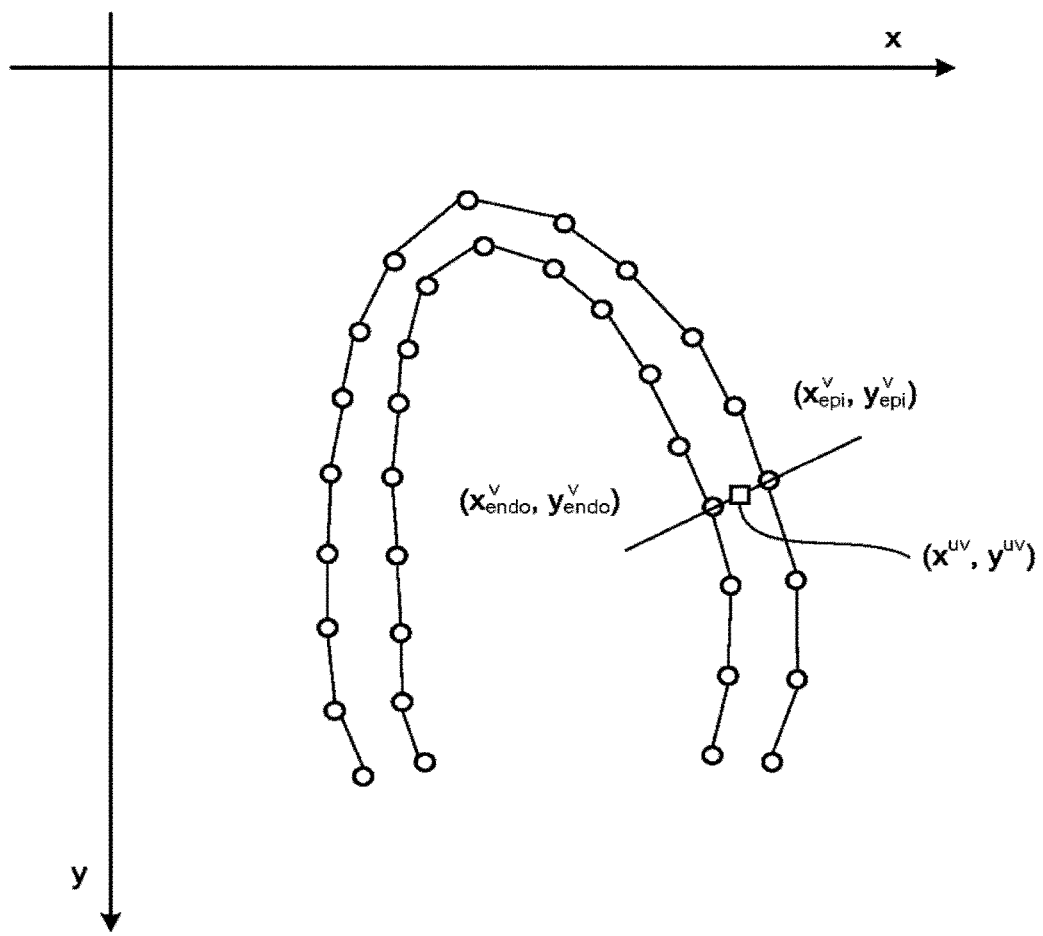
FIG. 3 is a diagram for explaining a boundary pattern according to the present embodiment.
Figure 4:
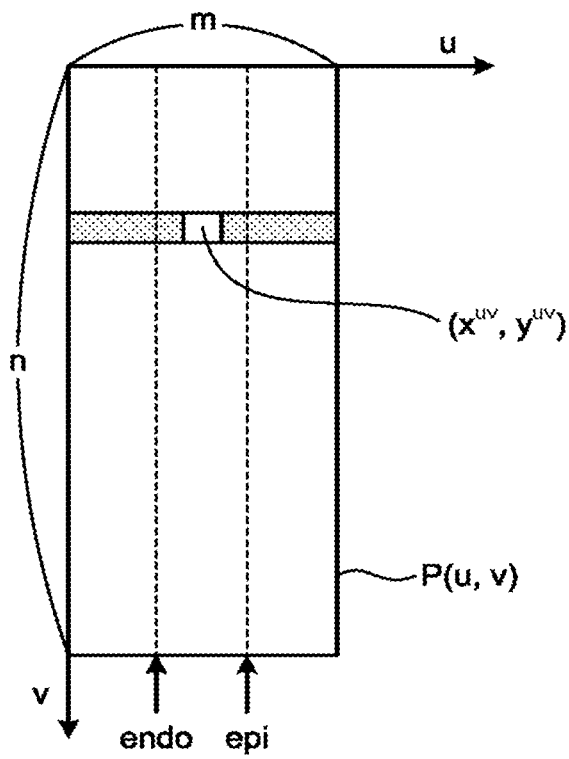
FIG. 4 is a diagram for explaining a boundary pattern according to the present embodiment.

FIG. 3 and FIG. 4 are diagrams for explaining a boundary pattern according to the present embodiment. For example, the updating function 122 resamples a brightness value at a point "(x^uv, y^uv)" on a line segment passing through a point on inner boundary of the myocardium "(x_endo^v, y_endo^v) and a point on the outer boundary of the myocardium (x_enpi^v, y_epi^v), from the medical image data 111. As a result, the updating function 122 creates the boundary pattern "P(u, v)" (refer to FIG. 1). Note that "v" is a positive integer satisfying 1≤v≤n.

As shown in FIG. 4, the boundary pattern is image data, the horizontal axis of which is "u" and the vertical axis of which is "v". "u" is a subscript of a parameter "t^u", and is expressed by Equation (5-1) and Equation (5-2) below.

$$x^{uv} = x_{endo}^{v} + t^{u}(x_{epi}^{v} - x_{endo}^{v}) \quad (5\text{-}1)$$

$$y^{uv} = y_{endo}^{v} + t^{u}(y_{epi}^{v} - y_{endo}^{v}) \quad (5\text{-}2)$$

That is, the boundary pattern defines a line segment that passes through respective points for 1 to n-th points approximating the outline of the left ventricle in the medical image data 111, and corresponds to image data extracting the brightness value at the point "(x^uv, y^uv)". The line segment defined herein passes through, for example, the outline of the myocardium, and is a line segment that connects a point at a position apart from the inner boundary of the myocardium for a predetermined distance toward the inside and a point at a position apart from the outer boundary of the myocardium for a predetermined distance toward the outside. On this line segment, m pieces of points are defined. That is, the boundary pattern corresponds to n pieces of line segments each of which includes m pieces of points in a direction perpendicular to the outline of the myocardium, and that are aligned in the direction of the outline of the myocardium. In other words, the boundary pattern corresponds to image data obtained by resampling the brightness value of a pixel included in an area apart from the myocardium toward the inside and the outside for a predetermined distance for n×m points, and formulating a width (thickness) of the myocardium. That is, in FIG. 4, "endo" corresponds to a position of the inner boundary of the myocardium and "epi" corresponds to a position of the outer boundary of the myocardium.

Moreover, in Equation (4), "P_dic(u, v)" is image data called a boundary pattern dictionary. For example, "P_dic(u, v)" is what is obtained by averaging respective boundary patterns acquired from multiple pieces of the sample image data, respectively.

That is, in Equation (4), when the weighting coefficient "b" is given, the outline vector "x" is calculated by Equation (2), the boundary pattern is acquired by the method shown in FIG. 4, and a square sum of a difference from the boundary pattern dictionary is calculated. Reduction of the cost with respect to the image "E_image(b)" by changing the weighting coefficient "b" is equivalent to deformation of the outline vector so as to be similar to the boundary pattern dictionary.

Next, the cost with respect to the shape of the outline "E_shape(b)" is explained. The cost with respect to the shape of the outline "E_shape(b)" is expressed, for example, by Equation (6) below.

$$E_{shape}(b) = \frac{1}{2} \sum_{i=1}^{L} \frac{b_i^2}{\lambda_i} \quad (6)$$

As shown in Equation (6), the cost with respect to the shape of the outline "E_shape(b)" is, for example, based on a sum of values obtained by dividing a square of the respective weighting coefficients "b_i" of 1 to L by the eigenvalue "λ_i" corresponding to a variance in the principal component analysis. That is, qualitatively, it corresponds to the outline vector "x" that is created by the weighting coefficient "b" being limited by the Mahalanobis' Distance from the average shape "x bar".

As described, the updating function 122 sets the cost function "E(b)" with respect to the outline vector "x". As the outline vector "x" can be expressed by the weighting coefficient "b" (refer to Equation (2)), the updating function 122 updates the outline vector "x" based on the derivative that is acquired by differentiating a cost function "E(b)" by the weighting coefficient "b" from the principal component analysis.

The derivative that is acquired by differentiating the cost function "E(b)" by the weighting coefficient "b" is explained. The derivative of the cost function "E(b)" can be acquired by differentiating each of the cost with respect to the image "E_image(b)" and the cost with respect to the shape of the outline "E_shape(b)". The outline used that is used to acquire the derivative has a shape that can be expressed as not a discontinuous but a continuous function.

For example, when the cost with respect to the image "E_image(b)" shown in Equation (4) is differentiated by the weighting coefficient "b", Equation (7) below is derived.

$$\frac{\partial E_{image}(b)}{\partial b_i} = 2 \sum_{v=1}^{n} \sum_{u=1}^{m} \{P(u,v) - P_{dic}(u,v)\} \frac{\partial P(u,v)}{\partial b_i} \quad (7)$$

Now, the boundary pattern "P(u, v)" is substituted with input image data "I(x^uv, y^uv)" according to Equation (5-1) and Equation (5-2) described above, and then Equation (7) is developed into a form of Equation (8) below.

$$\frac{\partial P(u,v)}{\partial b_i} = \frac{\partial I(x^{uv}, y^{uv})}{\partial b_i} \quad (8)$$

$$= \frac{\partial I(x^{uv}, y^{uv})}{\partial x^{uv}} \frac{\partial x^{uv}}{\partial b_i} + \frac{\partial I(x^{uv}, y^{uv})}{\partial y^{uv}} \frac{\partial y^{uv}}{\partial b_i}$$

$$= I_x(x^{uv}, y^{uv}) \frac{\partial x^{uv}}{\partial b_i} + I_y(x^{uv}, y^{uv}) \frac{\partial y^{uv}}{\partial b_i}$$

In Equation (8), "I_x(x^uv, y^uv)" is a differential value of an image "I" at a pixel "(x^uv, y^uv)" in a y direction.

Furthermore, by Equation (1), Equation (2), and Equation (5-1) described above, Equation (9-1) below is acquired. Moreover, by Equation (1), Equation (2), and Equation (5-2) described above, Equation (9-2) below can be acquired.

$$\frac{\partial x^{uv}}{\partial b_i} = \frac{\partial x^{uv}}{\partial x_{endo}} \frac{\partial x_{endo}}{\partial b_i} + \frac{\partial x^{uv}}{\partial x_{epi}} \frac{\partial x_{epi}}{\partial b_i} + \frac{\partial x^{uv}}{\partial t} \frac{\partial t}{\partial b_i} \quad (9-1)$$

$$= (1-t^u)\phi_{i,endo}^{v,x} + t^u \phi_{i,epi}^{v,x} + 0$$

$$\frac{\partial y^{uv}}{\partial b_i} = \frac{\partial y^{uv}}{\partial y_{endo}} \frac{\partial y_{endo}}{\partial b_i} + \frac{\partial y^{uv}}{\partial y_{epi}} \frac{\partial y_{epi}}{\partial b_i} + \frac{\partial y^{uv}}{\partial t} \frac{\partial t}{\partial b_i} \quad (9-2)$$

$$= (1-t^u)\phi_{i,endo}^{v,y} + t^u \phi_{i,epi}^{v,y} + 0$$

In Equation (9-1), "φ_i, endo^v, x" indicates an element (scaler) of an x coordinate value at a v-th point expressing the boundary an inner membrane of the myocardium in an i-th basis vector "φ_i". Furthermore, "φ_i, epi^v, x" indicates an element of an x coordinate value at a v-th point expressing the boundary of an outer membrane of the myocardium in the i-th basis vector "φ_i". Moreover, in Equation (9-2), "φ_i, endo^v, y" indicates an element of a y coordinate value at a v-th point expressing the boundary of the inner membrane of the myocardium in the i-th basis vector "φ_i". Furthermore, "φ_i, epi^v, y" indicates an element of a y coordinate value at a v-th point expressing the boundary of the outer membrane of the myocardium in the i-th basis vector "φ_i".

By Equation (7), Equation (8), Equation (9-1), and Equation (9-2) above, Equation (10) below is derived as a derivative with respect to the weighting coefficient "b" of the cost with respect to the image "E_image(b)".

$$\frac{\partial E_{image}(b)}{\partial b_i} = 2 \sum_{v=1}^{n} \sum_{u=1}^{m} \{P(u,v) - P_{dic}(u,v)\} \cdot \quad (10)$$

$$[I_x(x^{uv}, y^{uv})\{\phi_{i,endo}^{v,x} + t^u(\phi_{i,epi}^{v,x} - \phi_{i,endo}^{v,x})\} +$$

$$I_y(x^{uv}, y^{uv})\{\phi_{i,endo}^{v,y} + t^u(\phi_{i,epi}^{v,y} - \phi_{i,endo}^{v,y})\}]$$

On the other hand, by differentiating the cost with respect to the shape of the outline "E_shape(b)" shown in Equation (6) by the weighting coefficient "b", Equation (11) below is derived.

$$\frac{\partial E_{shape}(b)}{\partial b_i} = \frac{b_i}{\lambda_i} \quad (11)$$

Therefore, the gradient direction vector that is acquired by substituting the weighting coefficient "b" into the derivative that is acquired by differentiating the cost function "E(b)" by the weighting coefficient "b" is expressed by Equation (12) below based on Equation (3), Equation (10), and Equation (11).

$$\frac{\partial E(b)}{\partial b_i} = \alpha \frac{\partial E_{image}(b)}{\partial b_i} + \frac{\partial E_{shape}(b)}{\partial b_i} \quad (12)$$

The updating function 122 then updates the outline vector based on the gradient direction vector indicated in Equation (12). As described above, the outline vector "x" can be expressed by the weighting coefficient "b". Therefore, as indicated in Equation (13) below, updating the current weighting coefficient "b^(m)" to a new one "b^(m+1)" based on the gradient direction vector indicated by Equation (12) corresponds to updating the outline vector "x"

$$b^{(m+1)} = b^{(m)} - \eta \begin{bmatrix} \frac{\partial E(b^{(m)})}{\partial b_1} \\ \vdots \\ \frac{\partial E(b^{(m)})}{\partial b_L} \end{bmatrix} \quad (13)$$

In Equation (13), "η" indicates an appropriate weighting coefficient. Although an equation when the weighting coefficient "b" is updated based on the steepest descent method is shown in Equation (13), it is not limited thereto. The weighting coefficient "b" can be updated based on an algorithm of the conjugate gradient method, or of other gradient methods.

As described, the updating function 122 updates the outline vector "x" by updating the weighting coefficient "b". The updating function 122 updates the outline vector when the determining function 123 described later determines that deformation of the outline has not converged. In other words, the updating function 122 repeats update of the outline vector until the determining function 123 determines that the deformation of the outline has converged.

The determining function 123 determines whether a degree of the deformation accompanied by updating of the outline has converged based on convergence information of the outline vector that is updated by the updating function 122. For example, the determining function 123 determines whether the degree of the deformation has converged based on whether the weighting coefficient "b" has converged. The determining function 123 is one example of a determining unit.

For example, the determining function 123 determines that deformation of the outline has converged when an amount of change of the weighting coefficient "b" after update by the updating function 122 becomes smaller than a predetermined threshold. The determining function 123 causes the updating function 122 to repeat update of the outline vector until the determining function 123 determines that the degree of the deformation has converged. Moreover, the determining function 123 outputs the converged weighting coefficient "b" or outline vector "x" to the output control function 124 when determining that the degree of the deformation has converged.

As described, the determining function 123 determines whether deformation of an outline has converged. The processing of the determining function 123 described above is just one example. For example, although a case of determining whether deformation of an outline has converged by determining whether the weighting coefficient "b" has converged has been explained in the above explanation, embodiments are not limited thereto. For example, the determining function 123 can determine whether the cost function "E(b)" has converged, or whether the outline vector "x" has converged. Specifically, the determining function 123 calculates the cost function "E(b)" shown in Equation (3) by using the weighting coefficient "b" before and after update, and can determine that the outline vector "x" has converged when the difference becomes smaller than a predetermined threshold.

The output control function 124 outputs information relating to the outline of the subject. For example, when it is determined that the degree of the deformation has converged, the output control function 124 outputs information relating to the outline, by using the outline vector that is updated by the updating function 122. The output control function 124 is one example of an output control unit.

For example, the output control function 124 calculates the outline vector "x" by using the weighting coefficient "b" output from the determining function 123. The output control function 124 then causes an image expressing the outline of the left ventricle to be drawn on the medical image data 111, which is a subject of processing, by using the calculated outline vector "x", and displays the image on the display 102.

As described, the output control function 124 outputs information relating to an outline of a subject. The processing of the output control function 124 described above is just an example. For example, the output control function 124 is not necessarily required to display an image on the display 102. For example, the output control function 124 can display only coordinates of a row of points expressing an outline of a left ventricle on the display 102 based on the outline vector "x". Moreover, for example, the output control function 124 can output information relating to an outline to be used in various kinds of analyse such as heart chamber estimation, ejection fraction estimation, and an initial outline in myocardium tracking to grasp myocardial strain.

FIG. 5 is a flowchart showing a processing procedure of the medical-image processing apparatus 100 according to the present embodiment. The processing procedure shown in FIG. 5 is, for example, started when an instruction to start processing to detect an outline of a subject is accepted from an operator.

At step S101, it is determined whether it is time to start processing. For example, the input circuitry 101 accepts an instruction to start processing to detect an outline of a subject from an operator, and transmits the accepted instruction to the processing circuitry 120. Receiving the instruction transferred by the input circuitry 101, the processing circuitry 120 determines that it is time to start processing (step S101: YES), and starts processing from step S102 and later. When it is not time to start processing (step S101: NO), processing from step S102 and later is not started, and the respective processing functions of the processing circuitry 120 are in a stand-by state.

When positive determination is made at step S101, the acquiring function 121 acquires an initial value of an outline vector at step S102. For example, the acquiring function 121 sets an initial value of an outline vector of a left ventricle in two-dimensional ultrasonic image data of a heart of a subject.

At step S103, the updating function 122 calculates a gradient direction vector based on a derivative acquired by differentiating a cost function of the outline vector by a weighting coefficient. For example, the updating function 122 sets the cost function with respect to the outline vector. The updating function 122 then calculates the gradient direction vector that indicates a direction toward which the cost function decreases by substituting the outline vector into the derivative, based on the derivative that is acquired by differentiating the set cost function by the weighting coefficient "b" acquired by the principal component analysis of the outline vector.

At step S104, the updating function 122 updates the weighting coefficient by using the gradient direction vector. For example, the updating function 122 updates the weighting coefficient "b" based on the steepest descent method as shown in Equation (13).

At step S105, the determining function 123 determines whether the weighting coefficient has converged. When it is determined that the weighting coefficient has converged (step S105: YES), the processing circuitry 120 proceeds to processing at step S106. On the other hand, when it is determined that the weighting coefficient has not converged (step S105: NO), the processing circuitry 120 returns to the processing at step S103, and updates the weighting coefficient, again.

When positive determination is made at step S105, the output control function 124 outputs the outline vector at step S106. For ample, the output control function 124 extracts an image expressing the outline of the left ventricle in the medical image data 111, and displays the image on the display 102.

As described above, in the medical-image processing apparatus 100 according to the present embodiment, the acquiring function 121 acquires an initial value of the outline vector. The updating function 122 then updates the outline vector based on the derivative acquired by differentiating the cost function with respect to the outline vector by a coefficient that is acquired by the principal component analysis of the outline vector. Thus, the medical-image processing apparatus 100 can detect an outline of a subject included in medical image data at high speed.

For example, in a conventional technique, deformation of an outline has been practiced by calculating a gradient direction vector at a current outline, for each element of an outline vector, by using numerical differentiation with respect to an outline of a cost function. In this case, it is determined whether an outline has converged for each of elements. Therefore, even if an outline has converged for a first element, deformation of the outline is repeated until the outline converges for each of the remaining elements, and it therefore has been taking time for detecting an outline.

To the contrary, the medical-image processing apparatus 100 calculates a gradient direction vector at a current outline for all elements of the outline vector by using a derivative with respect to the outline of a cost function, and deforms the outline by using the calculated gradient direction vector. Therefore, a shape of an outline is to be determined for all elements if it is determined that the outline has converged, and therefore, the medical-image processing apparatus 100 can detect an outline at high speed without degrading the detection accuracy.

(Automatic Generation of Initial Value of Outline Vector)

For example, although the case of acquiring an initial value of an outline vector by using an edge line specified manually by an operator has been explained in the above embodiment, an initial value of the outline vector can also be generated automatically. A method of automatically generating an initial value of an outline includes, for example, a method in which a discriminator is caused to do learning by using training samples with known position, orientation, and scale of a left ventricle. In this case, for example, when input image data is newly input, the acquiring function 121 estimates a position, an orientation, and a scale of a subject (left ventricle) from the input image data by using the discriminator that has done learning. The acquiring function 121 applies an average outline shape of the subject in a coordinate system aligned by using the estimated position, orientation, and the scale, thereby generating an initial value of the outline vector automatically. The average outline shape can be acquired, for example, by averaging outline shapes that are indicated in the image data of the subject in advance. Moreover, for example, the acquiring function 121 applies what is approximated with a parabolic line to the shape of the subject. Thus, various kinds of methods are available. FIG. 6 is a diagram for explaining processing of the acquiring function 121 according to another embodiment.

(Specification of Apex and Heart Valve Annulus in Setting Initial Value of Outline Vector)

Furthermore, for example, the acquiring function 121 can accepts an operation to specify at least one coordinate value among coordinate values of an apex, a heart valve annulus, an edge line of an inner boundary of a myocardium, and an edge line of an outer boundary of a myocardium, and can acquire an initial value based on the specified coordinate value. For example, the acquiring function 121 further accepts specification of a characteristic part, such as an apex and a heart valve annulus, when accepting an initial value of the outline vector manually from the operator. In this case, for example, the acquiring function 121 accepts an operation to specify at least one point among three points in total of one point of the apex and two points of the heart valve annulus on ultrasonic image data of a left ventricle. Specifically, when the ultrasonic image data is input, the acquiring function 121 shows a display (message and the like) to prompt the operator to specify (point) a position of at least one point of the apex and the heart valve annulus on the image. The acquiring function 121 then automatically generates a position of another point to approximate an outline, by using the accepted position of the point. Thus, the operator can set an initial value of the outline vector with a simpler operation than that in the case of specifying an entire row of points. A point specified by an operator is not limited to that of an apex or a heart valve annulus, but can be any point on an edge line of an inner boundary of a myocardium and an outer boundary of a myocardium.

Furthermore, for example, when an apex and a heart valve annulus are specified by an operator, it can also be configured to prepare sample image data and principal component analysis in advance, assuming that the apex and the heart valve annulus are specified. Thus, when an apex and a heart valve annulus are specified, the updating function 122 can derive a derivative by applying sample image data and a result of principal component analysis corresponding to that case.

(Setting of Initial Value of Outline Vector in Moving Image)

Moreover, for example, when outline detection of the same subject is performed in a moving image, the acquiring function 121 can set an initial value of an outline vector based on an edge line of an outline that has been detected. For example, when an outline that has been detected is available in a frame adjacent (it can be a frame chronologically prior or later) to a frame of a subject of processing, the acquiring function 121 copies this outline and sets this as an outline vector of the frame of the subject of processing. That is, the acquiring function 121 can acquire an outline vector of an outline, the deformation of which has converged in another frame, as an initial value of an outline vector. Furthermore, for example, the acquiring function 121 can use an outline that has been subjected to weighted-averaging based on a distance between frames of adjacent multiple frames. Moreover, for example, the acquiring function 121 can set a result of tracking an outline from an adjacent frame by the template matching method or the like, as an initial value of an outline vector Thus, the processing of setting an initial value can be eased, and outline detection that does not fail in a time direction can be expected.

(Derivation of Derivative)

For example, although a case of deriving a derivative by differentiating a cost function by a weighting coefficient has been explained in the above embodiment, embodiments are not limited thereto. For example, the medical-image processing apparatus 100 can derive a derivative by differentiating a cost function by an outline vector. That is, in the medical-image processing apparatus 100, the acquiring function 121 acquires an initial value of an outline corresponding vector. Subsequently, the updating function 122 updates the outline corresponding vector based on the derivative acquired by differentiating the cost function with respect to the outline corresponding vector by the outline corresponding vector. The outline corresponding vector is an outline vector, or a vector that is expressed by a coefficient acquired by principal component analysis of the outline vector.

(Application to Ultrasonic Diagnostic Apparatus)

Moreover, the respective processing explained in the above embodiment can be applied to ultrasonic diagnostic apparatuses. For example, it can be implemented by further mounting the medical-image processing apparatus 100 described above on to an ultrasonic diagnostic apparatus including a scanner that scans a subject body by using ultrasonic waves and that collects reflected wave data corresponding to medical image data. It is not limited to the ultrasonic diagnostic apparatus, but it can be another medical diagnostic imaging apparatus. As another medical diagnostic imaging apparatus, for example, an X-ray diagnostic apparatus, an X-ray CT apparatus, an MRI apparatus, a SPECT apparatus, a PET apparatus, a SPECT-CT apparatus in which the SPECT apparatus and the CT apparatus are integrated, a PET-CT apparatus in which the PET apparatus and the x-ray CT apparatus are integrated, or a group of these apparatuses can be applied.

Furthermore, the illustrated respective components of the respective devices are of functional concepts, and it is not necessarily required to be configured physically as illustrated. That is, a specific form of distribution and integration of the respective devices is not limited to the one illustrated, but all or a part thereof can be configured be distributed or integrated functionally or physically in arbitrary units according to various kinds of loads, a use condition, and the like. Furthermore, as for the respective functions executed in the respective devices, all or a part thereof can be implemented by a CPU and a program that is analyzed and executed by the CPU, or can be implemented as hardware by wired logic.

Moreover, the medical-image processing method explained in the above embodiments can be implemented by executing a medical-image processing program that is prepared in advance by a computer, such as a personal computer and a workstation. This medical-image processing method can be distributed through a network such as the Internet. Furthermore, this medical-image processing program can be stored in a computer-readable recording medium, such as a hard disk, a flexible disk FD, a compact-disk read-only memory (CD-ROM), a magneto optical disk (MO), and a digital versatile disk (DVD), and can be executed by being read from the recording medium by a computer.

According to at least one of the embodiments explained above, an outline of a subject included in medical image data can be detected at high speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical-image processing apparatus, comprising:
processing circuitry configured to
    acquire an initial value of an outline corresponding vector that corresponds to an outline of a subject included in medical image data of a heart,
    update the outline corresponding vector based on a derivative that is acquired by differentiating a cost function with respect to the outline corresponding vector by the outline corresponding vector, and based on the initial value of the outline corresponding vector, and
    display, on a display, a medical image expressing the updated outline.

2. The medical-image processing apparatus according to claim 1, wherein
the processing circuitry is further configured to calculate a gradient direction vector expressing a direction toward which the cost function decreases, by substituting the outline corresponding vector into the derivative, and update the outline corresponding vector by using the calculated gradient direction vector.

3. The medical-image processing apparatus according to claim 1, wherein the processing circuitry is further configured to
    determine whether a degree of deformation accompanied by updating of the outline has converged based on convergence information of the outline corresponding vector to be updated,
    output, when determining that the degree of the deformation has converged, information relating to the outline by using the outline corresponding vector to be updated, and
    update, when determining that the degree of the deformation has not converged yet, the outline corresponding vector again.

4. The medical-image processing apparatus according to claim 1, wherein
the outline corresponding vector is any one of an outline vector expressing the outline, and a vector that is expressed by a coefficient acquired by principal component analysis of the outline vector.

5. The medical-image processing apparatus according to claim 1, wherein the processing circuitry is further configured to
    acquire an initial value of an outline vector expressing the outline, and
    update the outline vector based on a derivative acquired by differentiating a cost function with respect to the outline vector by a coefficient acquired by principal component analysis of the outline vector.

6. The medical-image processing apparatus according to claim 1, wherein
the processing circuitry is further configured to accept an operation to specify at least one coordinate value among coordinate values of an apex, a heart valve annulus, an edge line of an inner boundary of a myocardium, and an edge line of an outer boundary of the myocardium, and acquire the initial value based on the specified at least one coordinate value.

7. The medical-image processing apparatus according to claim 1, wherein the processing circuitry is further configured to acquire an outline vector of the outline, a degree of the deformation of which has converged in a frame out of a plurality of frames of a moving image of the subject imaged therein, as the initial value of the outline vector.

8. The medical-image processing apparatus according to claim 1, wherein
the subject includes at least one of a left ventricle, a right ventricle, a left atrium, and a right atrium in a myocardium of the heart, and
the outline includes at least one of an inner boundary and an outer boundary of the myocardium.

9. The medical-image processing apparatus according to claim 1, wherein
the processing circuitry is further configured to generate the medical image data based on reflected wave data collected by ultrasonic scanning of a region including the subject.

10. An ultrasonic diagnostic apparatus, comprising:
a scanner configured to scan a subject body by using ultrasonic waves, and collect reflected wave data; and
processing circuitry configured to
acquire an initial value of an outline corresponding vector that corresponds to an outline of a subject included in medical image data of a heart generated by the reflected wave data, and
update the outline corresponding vector based on a derivative acquired by differentiating a cost function with respect to the outline corresponding vector by the outline corresponding vector, and based on the initial value of the outline corresponding vector, and
display, on a display, a medical image expressing the updated outline.

11. A medical-image processing method, comprising:
acquiring an initial value of an outline corresponding vector that corresponds to an outline of a subject included in medical image data of a heart;
updating the outline corresponding vector based on a derivative that is acquired by differentiating a cost function with respect to the outline corresponding vector by the outline corresponding vector, and based on the initial value of the outline corresponding vector; and
displaying, on a display, a medical image expressing the updated outline.

* * * * *